Figure 1:
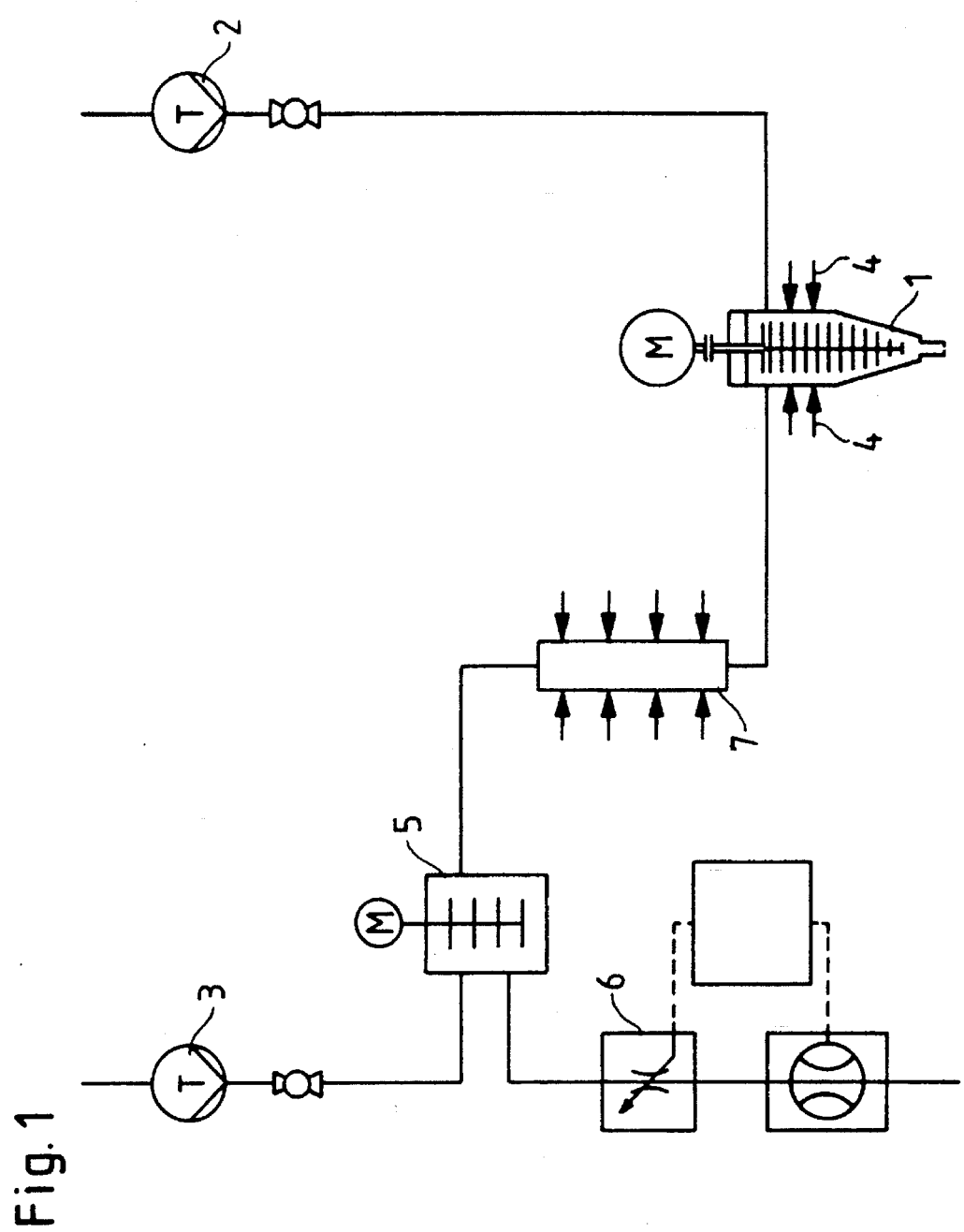

United States Patent [19]

Sulzbach et al.

[11] Patent Number: 5,521,224
[45] Date of Patent: May 28, 1996

[54] METHOD AND APPARATUS FOR CONTROLLING THE NUMBER OF CELLS IN POLYURETHANE FOAM

[75] Inventors: Hans-Michael Sulzbach, Königswinter; Reiner Raffel, Siegburg; Herbert Steilen, Königswinter, all of Germany

[73] Assignee: Maschinenfabrik Hennecke GmbH, Leverkusen, Germany

[21] Appl. No.: 453,845

[22] Filed: May 30, 1995

[30] Foreign Application Priority Data

Jun. 9, 1994 [DE] Germany ............... 44 20 168.0

[51] Int. Cl.⁶ ................... C08J 9/00; C08F 2/00
[52] U.S. Cl. ............. 521/155; 422/133; 422/135; 422/136; 521/917
[58] Field of Search ................... 422/133, 135, 422/136; 521/155, 917

[56] References Cited

U.S. PATENT DOCUMENTS

| | | | |
|---|---|---|---|
| 4,204,977 | 5/1980 | Zwirlein | 422/133 |
| 4,764,536 | 8/1988 | Proksa et al. | 521/50 |
| 4,933,115 | 6/1990 | Krippl et al. | 261/18.1 |
| 5,055,272 | 10/1991 | Wheeler et al. | 422/133 |
| 5,270,014 | 12/1993 | Bauer et al. | 422/133 |
| 5,296,517 | 3/1994 | Wetzig et al. | 521/155 |
| 5,451,376 | 9/1995 | Proksa et al. | 422/133 |

FOREIGN PATENT DOCUMENTS 3920994  1/1990  Germany .

*Primary Examiner*—Morton Foelak
*Attorney, Agent, or Firm*—Joseph C. Gil

[57] ABSTRACT

The invention relates to a method and an apparatus for producing polyurethane foam with a controlled number of cells, in which a gas is dispersed in one of the components, i.e. the polyol or the isocyanate, in a dispersing device arranged between the mixing head and the metering pump for the respective component.

4 Claims, 2 Drawing Sheets

METHOD AND APPARATUS FOR CONTROLLING THE NUMBER OF CELLS IN POLYURETHANE FOAM

BACKGROUND OF THE INVENTION

The present invention relates to a method for controlling the number of cells in polyurethane foams, in particular when using low pressure mixing heads in the continuous production of flexible polyurethane slabstock foam.

In the production of flexible polyurethane slabstock foam, the foam is normally produced by means of a blowing gas, usually carbon dioxide, which is formed by the reaction between the isocyanate and water. In order to ensure that a homogeneous cell structure is formed, it is necessary to generate gas bubble nuclei in the reaction mixture consisting of the isocyanate component and the polyol component. The quality of the resulting foam, i.e. the uniformity of the foam structure, is substantially determined by the uniformity of the bubble nuclei formed prior to the foaming process. In particular, the number of cells in the foam and their size is determined by the number of the available bubble nuclei. If only a small number of bubble nuclei are available, a foam is obtained with a correspondingly small number of large cells. If a large number of bubble nuclei are available, a foam is obtained with a large number of small cells per unit of volume.

Where high pressure mixing heads are used it has already been proposed to control the number of cells by controlling the content of dissolved gas (in particular air) in one of the components, namely the isocyanate component. The dissolved air is released in the form of fine bubble nuclei as the isocyanate component is injected into the mixing head (see, e.g., published European Application 565,974). The control of a specific content of dissolved air in the isocyanate is however complicated. The '974 published application proposes contacting the isocyanate with the air in a centrifuge, in which the isocyanate acquires a large liquid surface area as a result of the air pressure prevailing in the centrifuge.

According to other proposed methods (German Auslegeschrift 3,920,994, U.S. Pat. No. 4,933,115 and published European Application 239,720) the gas-loading process is carried out in special gas loading devices in which a partial stream of the respective component from a supply vessel is loaded with gas and the partial stream is returned to the supply vessel. The component is fed via metering pumps from the supply vessel to the mixing head. One disadvantage of this method is that the component is loaded with gas on the inlet side of the metering pump. This not only causes considerable metering problems but also damage to the dispersion due to the agglomeration of bubble nuclei as the component passes through the pump. In addition, a highly complicated procedure is required according to the above-mentioned methods for controlling the content of gas in the emulsion.

BRIEF DESCRIPTION OF THE INVENTION

FIG. 1 schematically illustrates a first embodiment of the present invention.

Figure 2:
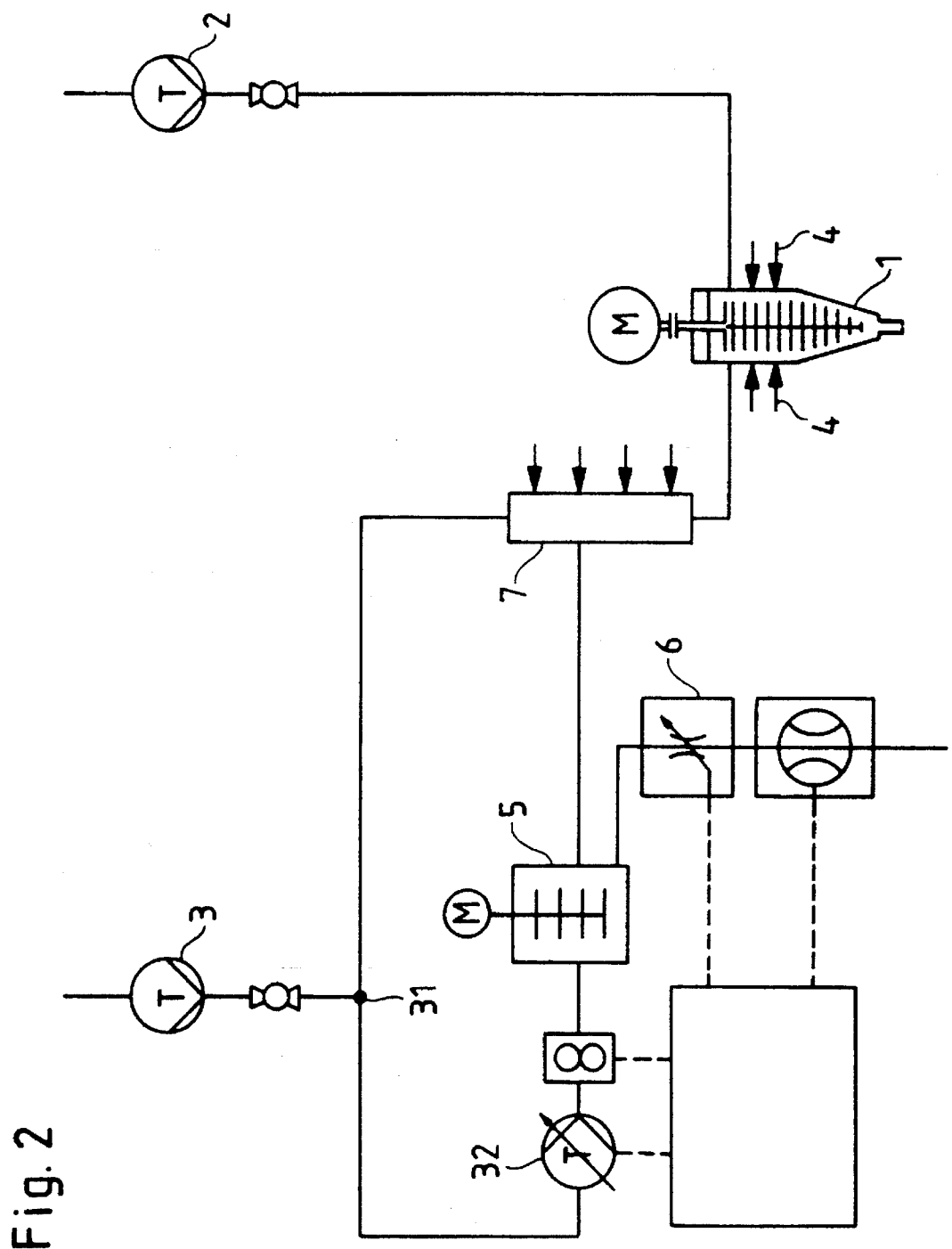

FIG. 2 schematically illustrates a second embodiment of the present invention.

DESCRIPTION OF THE INVENTION

The present invention requires the arrangement of the gas-dispersing device between the metering pump and the mixing head inlet for the polyol component, with the dispersing device being operated essentially without pressure. "Without pressure" is understood to mean a slightly elevated pressure in the order of 2 to 5, preferably 2 to 3, bars, which is necessary to overcome the resistance to flow in the feed line from the dispersing device to the mixing head inlet and the pressure in the mixing chamber of about 1 bar.

Preferably a dynamic mixer is used as the dispersing device, which is operated at a high speed of rotation, so that effective mixing of the quantities of polyol and gas metered into the device takes place with high shearing forces which ensure that the gas bubbles are effectively dispersed. According to the invention the gas bubbles of the resulting dispersion should have an average diameter of 40 to 100μ.

It has now been found that a simple stirring vessel can be used as the dispersing device, in which the stirrer is operated at a high speed of rotation, so that the dispersion contained in the stirring vessel revolves over the entire volume of the vessel and the liquid surface is trumpet- or cone-shaped, without a cushion of gas being formed at the top of the stirring vessel. If only one stirring blade is used it is preferably arranged at the bottom of the stirring vessel. The outlet for the polyol dispersion is preferably in the upper region of the cylindrical section of the jacket of the stirring vessel, i.e. in the region of upward flow of the revolving stream. The stirring vessel preferably has such dimensions that the resulting residence time of the polyol in the stirring vessel is 20 to 40 secs. Shorter residence times can also be obtained if correspondingly more complicated dispersing devices are used. Longer residence times do not generally produce any improvement in the polyol dispersion.

The number of cells in the polyurethane foam is determined by controlling the introduction of gas into the dispersing device. In particular, by controlling the gas introduced to within a range of between 0.05 and 2 volume % (under normal conditions), based on the quantity of polyol introduced, it is possible to vary the number of cells in the polyurethane foam to between 6 and 35 cells/cm.

Air or nitrogen, but preferably air, can be used as the dispersed gas. Even though the commonly used polyols have a dissolving power for air or nitrogen of about 10 volume % under normal conditions, which is higher than the quantity of gas to be dispersed in the polyol, the degree of saturation of the polyol with air or nitrogen has not been found to have any effect on the number of cells obtained. The times required for the dispersion of the polyol and its transportation to the mixing head are evidently so short that no significant phase transition of the gas takes place; these times are preferably between 10 and 80 seconds, and most preferably between 20 and 50 seconds.

According to the invention it is also possible merely to introduce a partial stream of the polyol into the dispersing device and to disperse a correspondingly higher volume percentage of gas in the polyol and to mix the main quantity of the polyol with the polyol dispersion in the mixing head. Of crucial importance for the number of cells obtained in the polyurethane foam is the quantity of dispersed gas based on the total quantity of the polyol employed.

According to the invention it is possible to reliably prevent the metering problems commonly associated with the metering of polyol/gas dispersions. In particular, no complicated measuring devices are required for measuring the content of gas in the polyol. In addition the short residence time between the formation of the dispersion and its introduction into the mixing head allows the number of cells to be reliably controlled regardless of whether the polyol employed is saturated or under-saturated with gas.

The invention is explained in more detail with reference to FIGS. 1 and 2.

FIG. 1 depicts a low pressure mixing head, e.g. a frictional mixer, for example, according to Diagram 4.53 on page 177 of "Kunststoff Handbuch" (Plastics Manual), Vol. 7, edited by Becker/Braun (1993). The isocyanate is fed to the mixing head 1 via metering pump 2 and the polyol via metering pump 3, according to the required isocyanate index. As indicated by arrows 4 additional additives can be introduced. A dispersing device 5, through which the polyol component flows, is arranged between the mixing head 4 and the metering pump 3. Also, gas is introduced via a control valve 6 for controlling the number of cells in the polyurethane foam. Devices 7 for additionally introducing additives, fillers and the like can also be provided between the dispersing device 5 and the mixing head 1.

In the embodiment according to FIG. 2, only a partial stream of the polyol is used for the dispersion of the gas. Identical reference numerals refer to the same elements as in FIG. 1. A branching point 31 is provided downstream of the metering pump 3 for dividing off the partial stream, and a partial stream pump 32 is also provided for the partial stream leading to the dispersing device 5.

The invention is further illustrated but is not intended to be limited by the following examples in which all parts and percentages are by weight unless otherwise specified.

EXAMPLES

EXAMPLE 1

A known polyurethane slabstock foam system was foamed in an experimental apparatus as shown in FIG. 1. 60 l/min of polyol were continuously introduced, via metering pump 3, into dispersing device 5, which consisted of a single-blade stirring vessel with a volume of 30 liters. Specific quantities of air were also introduced via control valve 6. 18 l/min of isocyanate were introduced into the mixing head 1 via metering pump 2. In the resulting polyurethane foam the number of cells per cm were counted in relation to the quantity of air introduced. The following correlation was determined:

| air in l/min | cells/cm |
|---|---|
| 0.06 | 9 |
| 0.12 | 12 |
| 0.2 | 15 |
| 0.6 | 25 |

EXAMPLE 2

300 l/min of polyol were introduced via pump 3 into an apparatus as shown in FIG. 2. A partial stream of 20 l/min was introduced via pump 32 into the stirring vessel with a volume of 10 liters. Specific quantities of air were also introduced into the stirring vessel via the control valve 6. 91 l/min of the isocyanate component were introduced into the mixing head 1 via pump 2. The following correlation was determined between the number of cells in the foam and the quantity of air introduced:

| air in l/min | cells/cm |
|---|---|
| 0.3 | 9 |
| 0.6 | 12 |
| 1.0 | 14 |
| 3.0 | 23 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for controlling the number of cells in the production of polyurethane foams comprising metering at least one polyol via a metering pump to a mixing head, metering at least one isocyanate via a metering pump to said mixing head, wherein said polyol and said isocyanate being mixed in said mixing head, with the addition of blowing agents and other additives and wherein bubble nuclei are generated in at least one of the said polyol or said isocyanate by dispersing a gas therein, and wherein the dispersion of the gas in the component is carried out between the metering pump and the mixing head.

2. The method of claim 1, wherein said polyol component is provided with bubble nuclei.

3. The method of claim 1, wherein the generation of the bubble nuclei is carried out essentially without pressure.

4. The method of claim 1, wherein the number of cells is controlled by the relative quantity of the gas dispersed in the form of bubble nuclei.

* * * * *